(12) United States Patent
Xu et al.

(10) Patent No.: US 11,039,573 B2
(45) Date of Patent: Jun. 22, 2021

(54) AUTOMATIC UNIFORM DISTRIBUTION APPARATUS AND AUTOMATIC ADJUSTING METHOD FOR THRESHED MATERIAL FROM HARVESTER

(71) Applicant: Jiangsu University, Jiangsu (CN)

(72) Inventors: Lizhang Xu, Jiangsu (CN); Ying Zhou, Jiangsu (CN); Yaoming Li, Jiangsu (CN); Zhong Tang, Jiangsu (CN); Zheng Ma, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 16/982,054

(22) PCT Filed: Jul. 13, 2018

(86) PCT No.: PCT/CN2018/095529
§ 371 (c)(1),
(2) Date: Sep. 18, 2020

(87) PCT Pub. No.: WO2019/178986
PCT Pub. Date: Sep. 26, 2019

(65) Prior Publication Data
US 2021/0015047 A1  Jan. 21, 2021

(30) Foreign Application Priority Data
Mar. 20, 2018 (CN) .......................... 201810228078.7

(51) Int. Cl.
*A01F 7/04* (2006.01)
*A01D 41/127* (2006.01)
(Continued)

(52) U.S. Cl.
CPC .............. *A01F 7/04* (2013.01); *A01D 41/127* (2013.01); *A01D 41/1271* (2013.01);
(Continued)

(58) Field of Classification Search
CPC .......... A01F 12/446; A01F 7/04; A01F 12/44; A01D 75/282; A01D 43/085;
(Continued)

(56) References Cited

U.S. PATENT DOCUMENTS 2,189,706 A * 2/1940 Clipston .............. A01D 75/282
460/10
2,732,941 A * 1/1956 Deiss .................... A01D 75/282
209/261
(Continued)

FOREIGN PATENT DOCUMENTS

| CN | 202059769 | 12/2011 |
| CN | 104137696 | 11/2014 |

(Continued)

OTHER PUBLICATIONS

"International Search Report (Form PCT/ISA/210) of PCT/CN2018/095529," dated Jul. 13, 2018, with English translation thereof, pp. 1-8.

*Primary Examiner* — Arpad Fabian-Kovacs
(74) *Attorney, Agent, or Firm* — JCIP Global Inc.

(57) ABSTRACT

An automatic uniform distribution apparatus for the threshed material from the combine harvester comprises a tangential flow threshing and separating device, a shaking plate threshed material detecting device, a shaking plate, a shaking plate flow guiding mechanism, an axial flow threshing and separating device, a chaff screw conveyor, a return plate, a return plate flow guiding mechanism, a return plate threshed material detecting device, a vibrating sieve, and an on-line detection controller. Force sensors are provided at lateral positions below discharge ports of the shaking plate and the return plate to measure flow rates of the threshed material in lateral regions of the shaking plate and the return plate.

7 Claims, 7 Drawing Sheets

(51) Int. Cl.
*A01D 43/08* (2006.01)
*A01D 75/28* (2006.01)
*A01F 12/44* (2006.01)

(52) U.S. Cl.
CPC ......... *A01D 43/085* (2013.01); *A01D 75/282* (2013.01); *A01F 12/44* (2013.01); *A01F 12/446* (2013.01); *A01D 41/1272* (2013.01); *A01D 41/1276* (2013.01); *A01D 41/1278* (2013.01)

(58) Field of Classification Search
CPC .............. A01D 41/127; A01D 41/1271; A01D 41/1278; A01D 41/1272; A01D 41/1276
See application file for complete search history.

(56) References Cited

U.S. PATENT DOCUMENTS

| | | | | |
|---|---|---|---|---|
| 4,557,276 A | * | 12/1985 | Hyman | A01D 75/285 209/416 |
| 4,875,889 A | * | 10/1989 | Hagerer | A01D 75/282 460/1 |
| 4,897,071 A | * | 1/1990 | Desnijder | A01D 75/282 460/10 |
| 5,525,108 A | * | 6/1996 | Rouse | A01F 12/448 460/101 |
| 8,118,649 B1 | * | 2/2012 | Murray | A01F 12/28 460/5 |
| 8,951,105 B2 | * | 2/2015 | Murray | A01F 12/448 460/101 |
| 10,716,255 B2 | * | 7/2020 | Xu | A01D 41/127 |
| 10,721,869 B2 | * | 7/2020 | Duquesne | A01D 75/282 |
| 2006/0229119 A1 | * | 10/2006 | Wamhof | A01F 12/44 460/101 |
| 2013/0109450 A1 | * | 5/2013 | Puvak | A01F 12/32 460/101 |
| 2013/0116018 A1 | * | 5/2013 | Ricketts | A01D 75/282 460/9 |
| 2013/0157731 A1 | * | 6/2013 | Biggerstaff | A01F 12/444 460/1 |
| 2013/0158816 A1 | * | 6/2013 | Murray | A01D 75/282 701/50 |
| 2014/0335923 A1 | * | 11/2014 | Biggerstaff | A01D 41/127 460/75 |
| 2017/0311547 A1 | * | 11/2017 | Fuchs | A01D 41/1276 |

FOREIGN PATENT DOCUMENTS

| | | |
|---|---|---|
| CN | 104855058 | 8/2015 |
| CN | 104982149 | 10/2015 |
| CN | 107182453 | 9/2017 |
| JP | 2017131143 | 8/2017 |

* cited by examiner

AUTOMATIC UNIFORM DISTRIBUTION APPARATUS AND AUTOMATIC ADJUSTING METHOD FOR THRESHED MATERIAL FROM HARVESTER

CROSS-REFERENCE TO RELATED APPLICATION

This application is a 371 of international application of PCT application serial no. PCT/CN2018/095529, filed on Jul. 13, 2018, which claims the priority benefit of China application no. 201810228078.7, filed on Mar. 20, 2018. The entirety of each of the above mentioned patent applications is hereby incorporated by reference herein and made a part of this specification.

BACKGROUND

Technical Field

The present invention relates to the field of intelligent control of combine harvesters, and specifically to an automatic uniform distribution apparatus and an automatic adjusting method for a threshed material from a combine harvester.

Description of Related Art

At present, along with the large-scale promotion of high-yield rice, there is an increasing demand for the mechanization of rice harvesting, which requires combine harvesters to develop toward high feeding amount and high efficiency while ensuring good operating performance. In addition, automation and agriculturalization are also important measures of modern agricultural machinery. However, the intelligence level of combine harvesters in China is still low, and there is a lack of working parts that can perform adaptive adjustment according to the characteristics of dynamic threshed material distribution. Under the action of centrifugal force, the threshed material from the axial flow threshing and separating device is transversely distributed in a pattern of high on both sides and low in the middle, which leads to problems, such as the threshed material accumulating on two sides of the surface of the cleaning sieve and affecting the sieving, and inevitably reduces the cleaning efficiency and degrades the performance. The more uniformly the threshed material from the threshing and separating device is distributed on the sieve surface, the more conducive to the sieving of grains and the blowing of the airflow, and thus, the cleaning efficiency and performance can be significantly improved under the condition of a determined cleaning area. To solve the problem of non-uniform distribution of the threshed material from the axial flow threshing and separating device and improve the cleaning efficiency, various studies have been carried out. For example, Patent No. CN202059769U discloses a vibration cleaning sieve for a longitudinal flow-cutting and full-feeding combine harvester, where the front end of the top sieve warps upward and forms a 0.1-25-degree included angle with the plane where the louver sieve lies, and a plurality of guide plates are arranged on the top sieve. Although the top sieve and the guide plates respectively solve the problems of too dense distribution of the threshed material in longitudinal and transverse directions, there is no adaptive device, which leads to the inability to detect in real time the distribution of threshed material and then perform adaptive regulation. Patent No. CN201510157999.5 discloses an intelligent adjusting mechanism and adjusting method for distribution of a threshed material from an axial flow threshing and separating device, in which an amount of grain cleaning loss detected by a grain cleaning loss detection controller is used as sampling information, and the degree of opening of flow guiding plates is taken as the controlled object. A plurality of threshed material devices are arranged below a concave sieve. The threshed material devices each include a step-type electric push rod, an arc baseplate, and a spring. A plurality of flow guiding assemblies are arranged on the arc baseplate. The degree of opening of the flow guiding plates in the flow guiding assemblies can be adjusted by changing the displacement of the step-type electric push rod, to avoid problems such as the threshed material accumulating on a part of the sieve surface to degrade the cleaning performance, and achieve a relatively uniform distribution of the threshed material. However, this device, which uses grain loss force sensors to acquire amount-of-loss signals to indirectly evaluate the uniformity of threshed material on the sieve surface, can only estimate the approximate distribution of threshed material. As this device does not include sensors for monitoring in real time the threshed material flow rate, the threshed material flow rate cannot be accurately measured in real time and therefore cannot be adjusted in real time, resulting in a poor adjustment sensitivity and effect.

SUMMARY

In view of defects in the prior art that a threshed material from an axial flow threshing and separating device is not uniformly distributed and accumulates on two sides of the surface of a cleaning sieve to affect the sieving and severely reduce the cleaning efficiency and performance, the present invention provides an automatic uniform distribution apparatus and an automatic adjusting method for a threshed material from a combine harvester.

To achieve the above purposes of the present invention, the present invention adopts the following technical solution. An automatic uniform distribution apparatus for a threshed material from a combine harvester includes a tangential flow threshing and separating device, an axial flow threshing and separating device, a chaff screw conveyor, and a vibrating sieve. A shaking plate and a return plate are disposed above two ends of the vibrating sieve, the shaking plate is located below the tangential flow threshing and separating device, the return plate is located below the axial flow threshing and separating device and the chaff screw conveyor, the shaking plate includes a shaking plate flow guiding mechanism mounted on a side thereof onto which the threshed material from the tangential flow threshing and separating device falls, a shaking plate threshed material detecting device is mounted at a discharge port of the shaking plate, the return plate includes a return plate flow guiding mechanism mounted on a side thereof onto which the threshed material from the axial flow threshing and separating device falls, a return plate threshed material detecting device is mounted at a discharge port of the return plate, the shaking plate threshed material detecting device and the return plate threshed material detecting device are both connected to an input terminal of an on-line detection controller, and the on-line detection controller is configured to control action processes of the shaking plate flow guiding mechanism and the return plate flow guiding mechanism.

In the above solution, the shaking plate flow guiding mechanism includes a first ball-head push rod, a shaking plate electric cylinder fixing bracket, a shaking plate electric cylinder, a shaking plate welding plate, shaking plate flow guiding bars and a first connecting rod. One end of each of the shaking plate flow guiding bars is connected to the shaking plate by a hinge, the shaking plate electric cylinder is connected to a lower side of the shaking plate by the shaking plate electric cylinder fixing bracket and pushes the first ball-head push rod by the shaking plate electric cylinder so as to drive the hinge to rotate, so that an angle of the shaking plate flow guiding bars on the shaking plate is adjustable, and other ends of the shaking plate flow guiding bars are connected to each other by the shaking plate welding plate and the first connecting rod to achieve linkage of the shaking plate flow guiding bars.

In the above solution, the shaking plate threshed material detecting device includes a shaking plate detecting device mounting bracket, shaking plate threshed material detecting plates are mounted above the shaking plate detecting device mounting bracket, shaking plate force sensors are mounted below the shaking plate threshed material detecting plates, and two ends of the shaking plate detecting device mounting bracket are connected to a rack by a first shaking plate vibration damper and a second shaking plate vibration damper.

In the above solution, the shaking plate electric cylinder is connected to an output terminal of the on-line detection controller, and the shaking plate force sensors are connected to the input terminal of the on-line detection controller.

In the above solution, the return plate flow guiding mechanism includes a second connecting rod, a return plate welding plate, a return plate electric cylinder fixing bracket, a return plate electric cylinder, a second ball-head push rod and return plate flow guiding bars. One end of each of the return plate flow guiding bars is connected to the return plate by a hinge, the return plate electric cylinder is connected to a lower side of the return plate by the return plate electric cylinder fixing bracket and pushes the second ball-head push rod by the return plate electric cylinder so as to drive the hinge to rotate, so that an angle of the return plate flow guiding bars on the return plate is adjustable, and other ends of the return plate flow guiding bars are connected to each other by the return plate welding plate and the second connecting rod to achieve linkage of the return plate flow guiding bars.

In the above solution, the return plate threshed material detecting device includes a return plate detecting device mounting bracket, return plate threshed material detecting plates are mounted above the return plate detecting device mounting bracket, return plate force sensors are mounted below the return plate threshed material detecting plates, and two ends of the return plate threshed material detecting device are connected to a rack by a first return plate vibration damper and a second return plate vibration damper.

In the above solution, the return plate electric cylinder is connected to an output terminal of the on-line detection controller, and the return plate force sensors are connected to the input terminal of the on-line detection controller.

The present invention further provides an automatic adjusting method for a threshed material from a combine harvester. The automatic adjusting method includes the following steps.

S1: Determining a rated threshed material adjustment index $\sigma$ a through theoretical calculation and bench testing according to throughput of a threshing and cleaning device of a combine harvester, with reference to crop characteristics and national standards for harvesting machinery.

S2: Measuring threshed material flow rates $A_1$, $A_2$, $A_3$, ..., $A_n$ (measured in kg/s) corresponding to different lateral regions 1, 2, 3, ..., n ($3 \leq n \leq 6$) of a discharge port of a shaking plate by using shaking plate force sensors, and measuring threshed material flow rates $B_1$, $B_2$, $B_3$, ..., $B_n$ (measured in kg/s) corresponding to different lateral regions 1, 2, 3, ..., n ($3 \leq n \leq 6$) of a discharge port of a return plate by using return plate force sensors.

S3: Performing preprocessing including abnormal data replacement, missing data completion, and data de-noising on acquired signals of the threshed material flow rates $A_1$, $A_2$, $A_3$, ..., $A_n$ (measured in kg/s) of the shaking plate and the threshed material flow rates $B_1$, $B_2$, $B_3$, ..., $B_n$ (measured in kg/s) of the return plate, correspondingly summing and amplifying the preprocessed signals to obtain total threshed material flow rates $C_1$, $C_2$, $C_3$, ..., $C_n$ ($3 \leq n \leq 6$) of the threshed material to be fed to a cleaning device, and transmitting the total threshed material flow rates to an on-line detection controller.

S4: Calculating a standard deviation $\sigma_c$ of $C_1$, $C_2$, $C_3$, ..., $C_n$ by the on-line detection controller based on an adaptive adjustment model by using detected values as input values, determining whether $\sigma_c \leq \sigma_a$, and if yes, maintaining current positions of flow guiding bars, and ending automatic adjustment of the threshed material; or if not, performing a clustering analysis of parametric time series of total threshed material flow rates $C_1$, $C_2$, $C_3$, $C_n$ ($3 \leq n \leq 6$) of the regions, an angle $\alpha$ of a shaking plate flow guiding mechanism and an angle $\beta$ of a return plate flow guiding mechanism which are acquired in real time, to find a rule $C_n = f(\alpha, \beta, t, C_n)$ ($3 \leq n \leq 6$) between the angle $\alpha$ of the shaking plate flow guiding mechanism, the angle $\beta$ of the return plate flow guiding mechanism and the threshed material flow rate Cn of each of the regions, studying an adjustment weight model of the shaking plate flow guiding mechanism and the return plate flow guiding mechanism, and building an adaptive adjustment model for a threshed material adjustment weight; outputting in real time corresponding control signals to control a shaking plate electric cylinder and a return plate electric cylinder to respectively drive a first ball-head push rod to experience a displacement change a and a second ball-head push rod to experience a displacement change b, so that the angle of the shaking plate flow guiding mechanism and the angle of the return plate flow guiding mechanism are respectively adjusted by $\alpha = f(a, \alpha)$ and $\beta = f(b, \beta)$; and comparing $C_1$, $C_2$, $C_3$, $C_n$ to obtain $C_{min}$, setting $C_{adj} = C_{min} - C_{avg}$, and according to $C_n = f(\alpha, (3, \beta, t, C_n)$ ($3 \leq n \leq 6$) and the adaptive adjustment model for the threshed material adjustment weight, inversely calculating the a and b that need to be adjusted, wherein $C_{min}$ is a minimum of threshed material amounts of the regions, $C_{adj}$ is a threshed material adjustment amount, and $C_{avg}$ is an average of the threshed material amounts of the regions.

S5: Going back to step S2 to repeat the process until $\sigma_c \leq \sigma_a$, maintaining current positions of the flow guiding bars, and ending automatic adjustment of the threshed material.

The present invention has the following beneficial effects. (1) By using the force sensors to detect the flow rates of threshed material in lateral regions and transmit same to the on-line detection controller, which compares online the real-time flow rates of the regions and further controls the shaking plate flow guiding mechanism and the return plate flow guiding mechanism to adjust the threshed material in the lateral regions of the discharge ports of the shaking plate and the return plate, a uniform distribution of the threshed material is achieved, thereby improving the cleaning efficiency and performance. (2) By arranging three to six force sensors at lateral positions on the discharge ports of the shaking plate and the return plate to directly detect the flow rates of the threshed material in three to six lateral regions of the shaking plate and the return plate and using the standard deviation of the threshed material flow rates of the regions as an indicator for evaluating whether the threshed material is uniformly distributed, the present invention is direct and efficient. (3) By using the on-line detection and control system consisting of the force sensors, the on-line detection controller, the electric cylinders and a direct-current power supply to regulate the flow guiding mechanisms, the present invention achieves the automatic real-time uniform distribution of the threshed material that is about to enter the cleaning chamber, facilitates the sieving of grains and blowing of an airflow, can significantly improve the cleaning efficiency and performance under the condition of a determined cleaning area, and is applicable to combine harvesters with various threshing roller combinations, for example, multi-roller threshing and separating devices such as a tangential-axial flow device, a multi-tangential-flow double-longitudinal-axial-flow threshing device, and a horizontal-axis-flow+horizontal-axis-flow device, to achieve a uniform threshed material distribution. (4) The present invention, not influenced by crop characteristics, is applicable to various crops such as wheat, soybean, rice, rape, and corn, and therefore can greatly promote the technological progress in the field of adaptive control of harvesting machinery in China and has broad application prospects.

DESCRIPTION OF THE EMBODIMENTS

The present invention is described in further detail below with reference to the accompanying drawings and specific embodiments, but the scope of protection of the present invention is not limited thereto.

Figure 1:
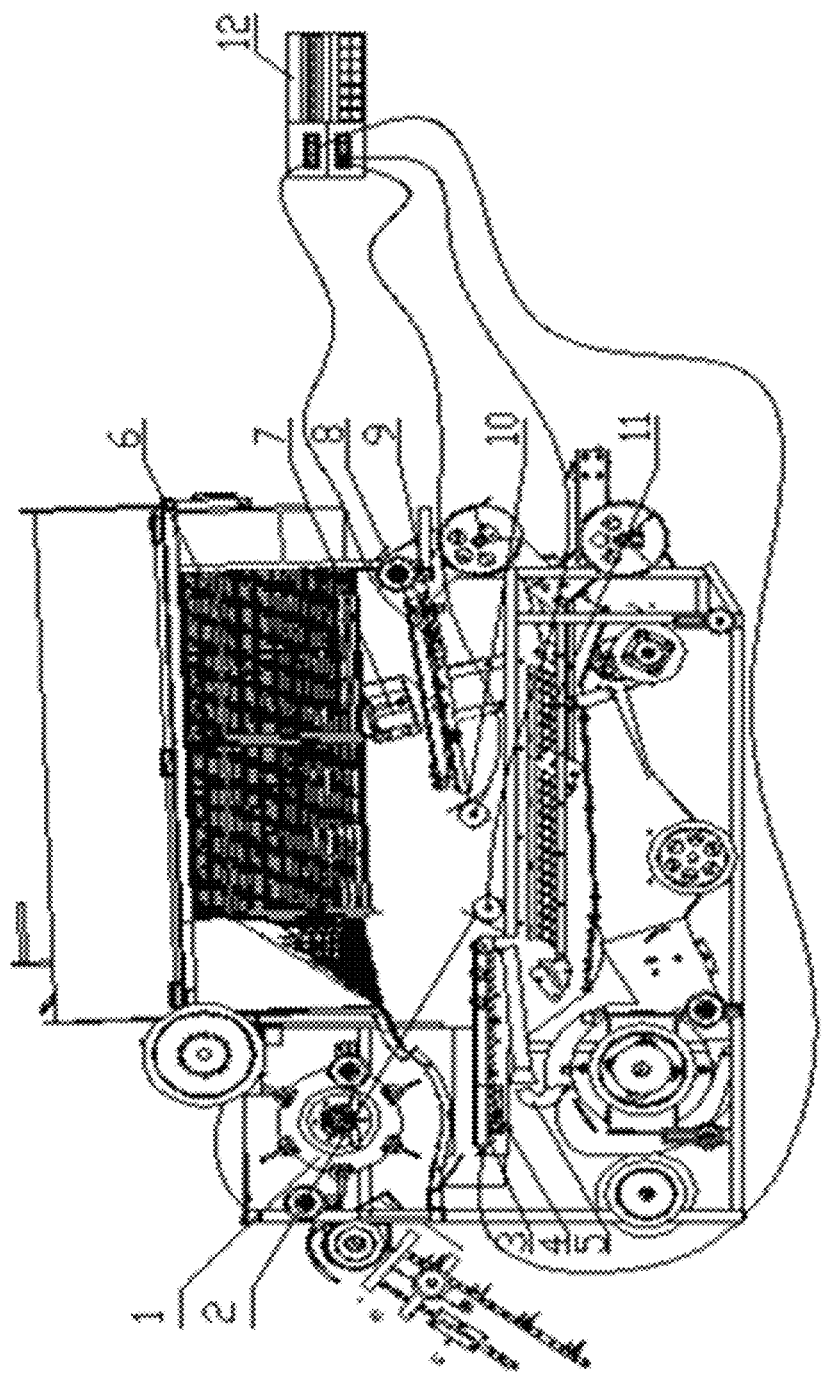
FIG. 1 is a front view of an automatic uniform distribution apparatus for a threshed material from a combine harvester.

As shown in FIG. 1, an automatic uniform distribution apparatus for a threshed material from a combine harvester of this embodiment includes a tangential flow threshing and separating device 1, a shaking plate threshed material detecting device 2, a shaking plate 3, a shaking plate flow guiding mechanism 4, a multi-duct blower 5, an axial flow threshing and separating device 6, a chaff screw conveyor 7, a return plate 8, a return plate flow guiding mechanism 9, a return plate threshed material detecting device 10, a vibrating sieve 11 and an on-line detection controller 12. The shaking plate flow guiding mechanism 4 is mounted on the shaking plate 3. The shaking plate 3 is located below the tangential flow threshing and separating device 1 and above the vibrating sieve 11, and is configured to uniformly distribute and shake threshed material from the tangential flow threshing and separating device 1, and convey the threshed material to the front end of the vibrating sieve 11, thereby significantly improving the cleaning efficiency and quality. The return plate flow guiding mechanism 9 is mounted on the return plate 5. The return plate 5 is located below the axial flow threshing and separating device 6 and above the vibrating sieve 11, and is configured to shake and uniformly distribute threshed material from the axial flow threshing and separating device 6 and secondary chaff conveyed by the chaff screw conveyor 7 and convey same back to the front end of the vibrating sieve 11, thereby improving the cleaning efficiency and quality.

Figure 2:
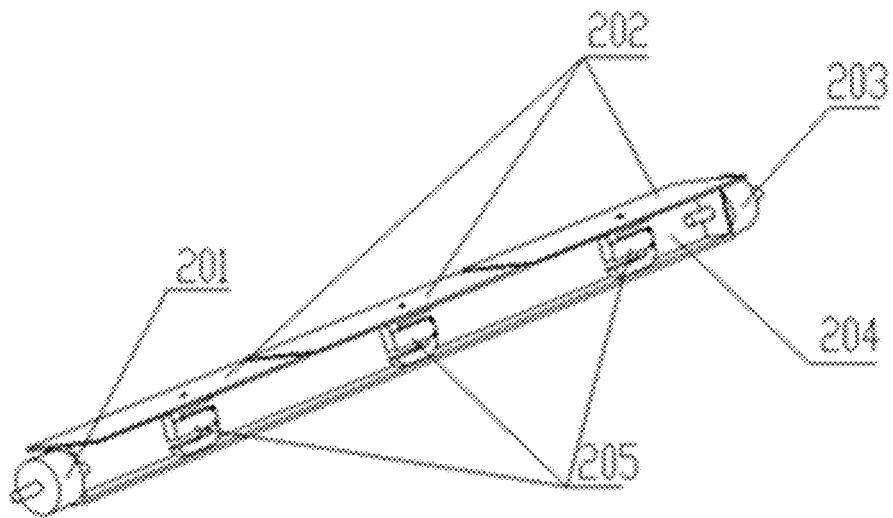
FIG. 2 is a schematic view of a shaking plate threshed material detecting device.

As shown in FIG. 2, the shaking plate threshed material detecting device 2 includes a first shaking plate vibration damper 201, shaking plate threshed material detecting plates 202, a second shaking plate vibration damper 203, a shaking plate detecting device mounting bracket 204 and shaking plate force sensors 205. The shaking plate threshed material detecting plates 202 and the shaking plate force sensors 202 are perpendicularly connected to the shaking plate detecting device mounting bracket 204, and then connected to a rack by the first shaking plate vibration damper 201 and the second shaking plate vibration damper 203, so that the shaking plate threshed material detecting plates 202 face exactly toward the discharge port of the shaking plate 3 to monitor the real-time flow rates of threshed material in the regions corresponding to the shaking plate threaded material detecting plates 202. The number of shaking plate threshed material detecting plates 202 is 3-6 depending on the characteristics of dynamic threshed material distribution, and needs to be determined according to the actual geometric dimensions of the machine.

Figure 3:
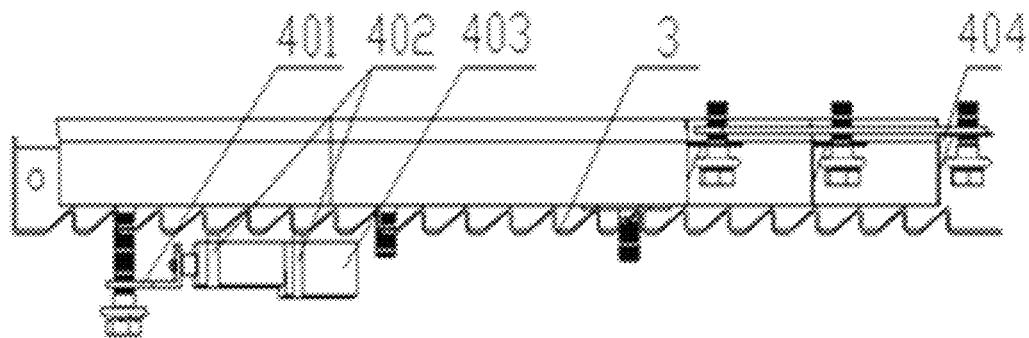
FIG. 3 is a front view of a shaking plate flow guiding mechanism.
Figure 4:
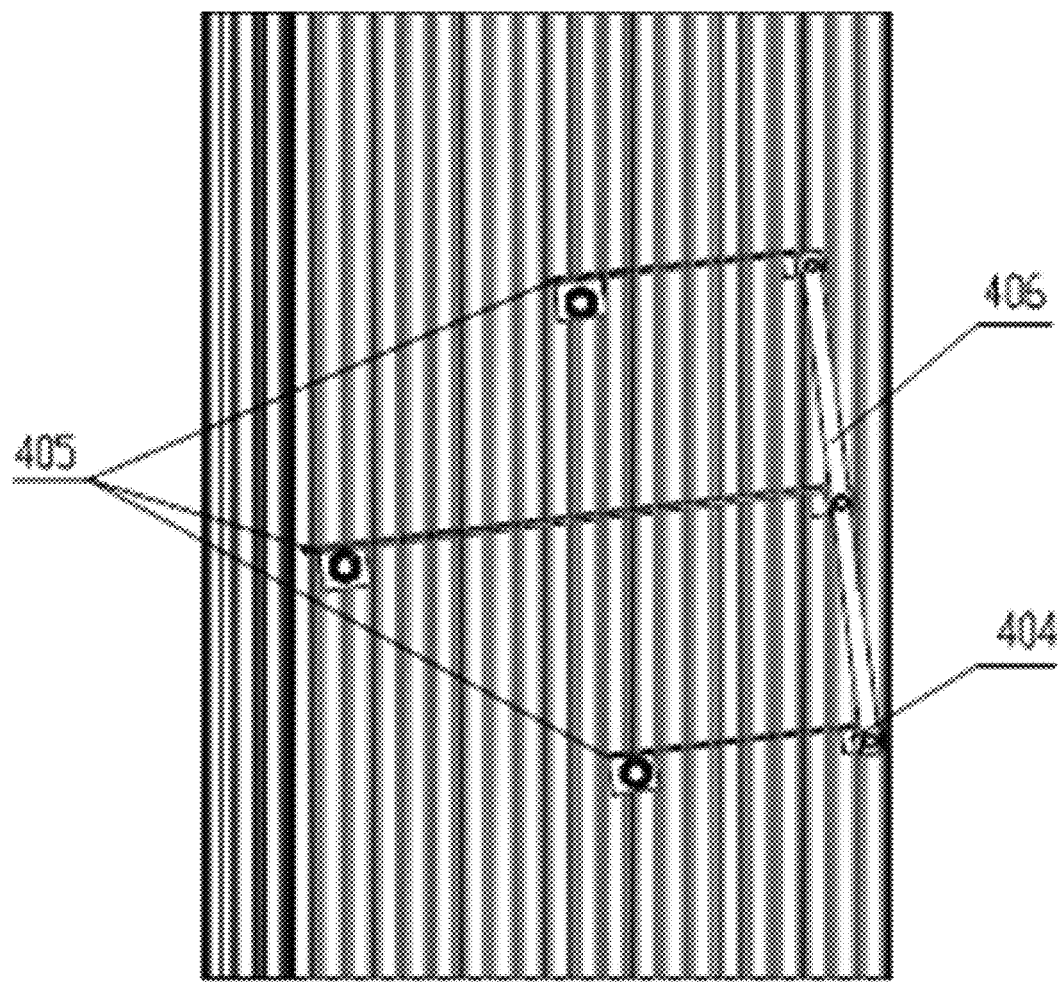
FIG. 4 is a top view of the shaking plate flow guiding mechanism.

As shown in FIG. 3 and FIG. 4, the shaking plate flow guiding mechanism 4 includes a first ball-head push rod 401, a shaking plate electric cylinder fixing bracket 402, a shaking plate electric cylinder 403, a shaking plate welding plate 404, shaking plate flow guiding bars 405 and a first connecting rod 406. One end of each of the shaking plate flow guiding bars 405 is connected to the shaking plate 3 by a hinge. The shaking plate electric cylinder 403 is connected to a lower side of the shaking plate 3 by the shaking plate electric cylinder fixing bracket 402 and pushes the first ball-head push rod 401 by the shaking plate electric cylinder 403 so as to drive the hinge to rotate so that an angle of the shaking plate flow guiding bars 405 on the shaking plate 3 can be adjusted. The angle can be adjusted within a range of 0°-180°. The other ends of the shaking plate flow guiding bars 405 are connected to each other by the shaking plate welding plate 404 and the first connecting rod 406 to achieve linkage of the shaking plate flow guiding bars. In practice, the number of shaking plate flow guiding bars 405 is 2-5, with a height of 30 mm-50 mm and a length of 100 mm-400 mm, which need to be determined through theoretical calculation and experimental verification according to the actual geometric dimensions of the machine.

Figure 5:
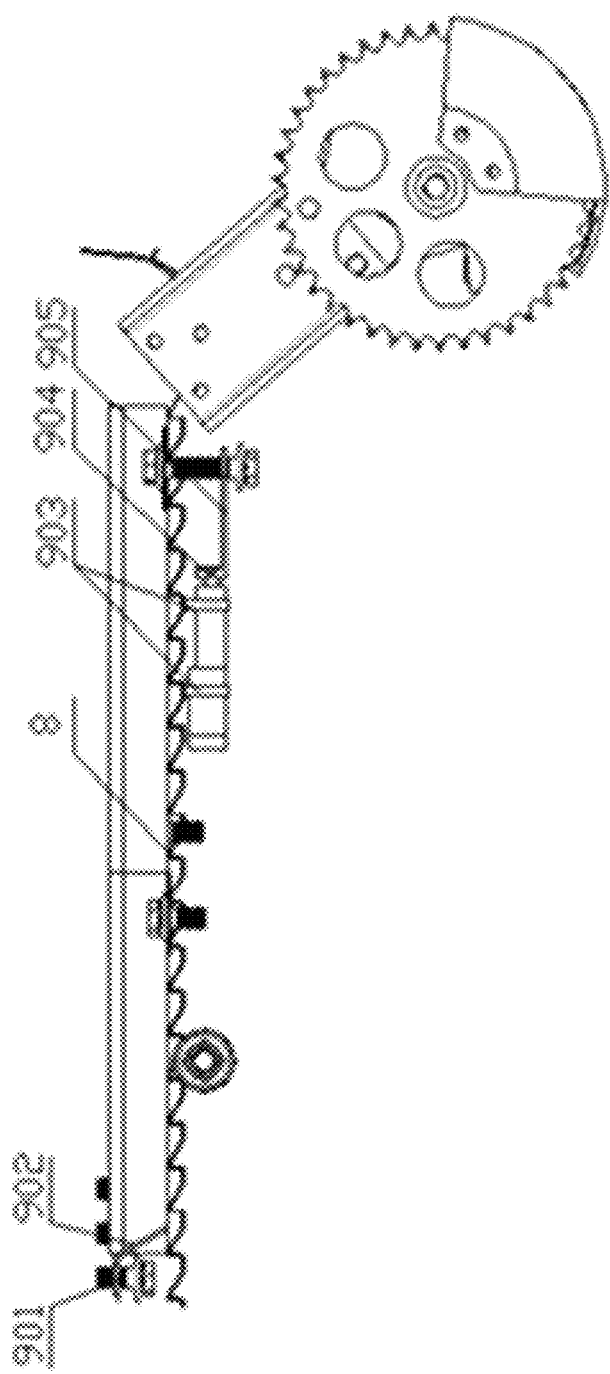
FIG. 5 is a front view of a return plate flow guiding mechanism.
Figure 6:
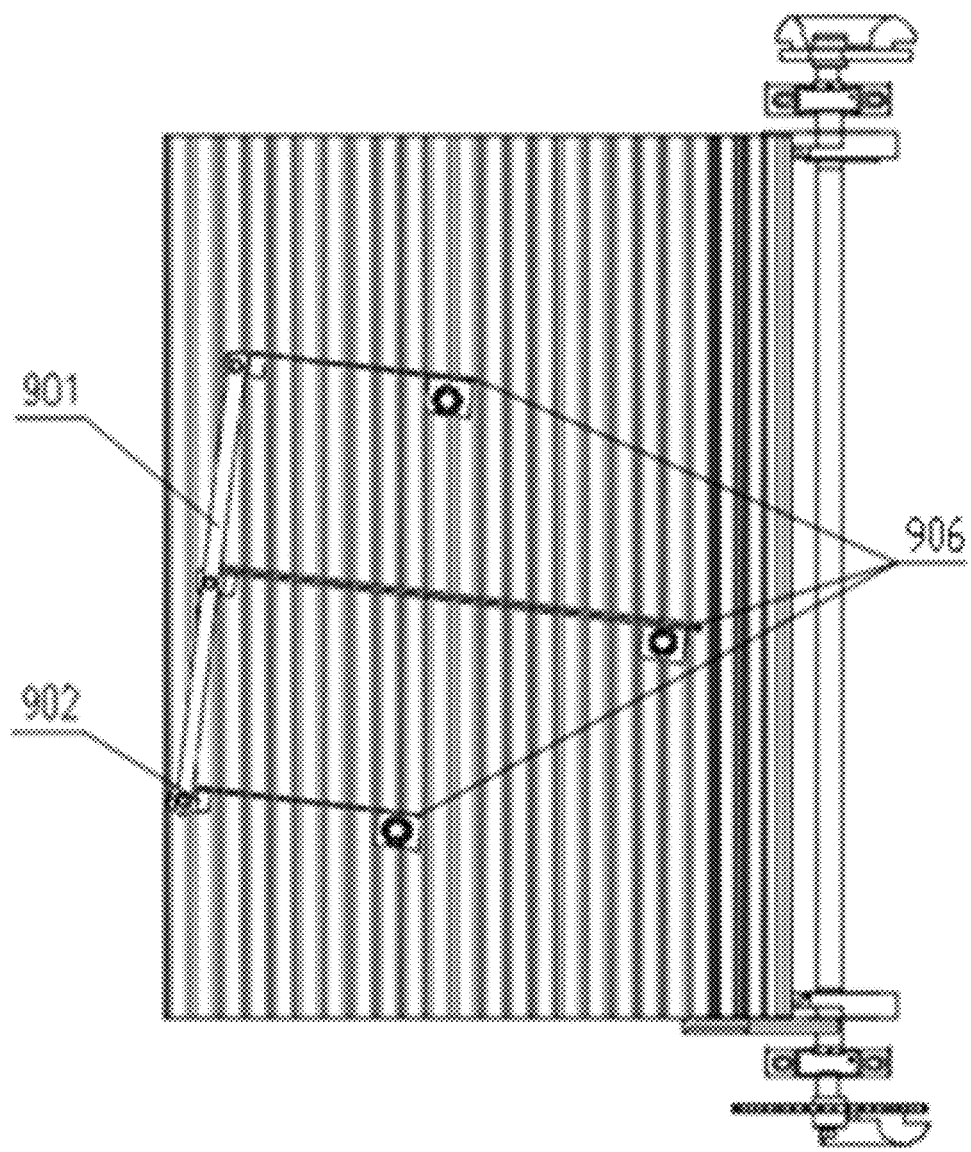
FIG. 6 is a top view of the return plate flow guiding mechanism.

As shown in FIG. 5 and FIG. 6, the return plate flow guiding mechanism 9 includes a second connecting rod 901, a return plate welding plate 902, a return plate electric cylinder fixing bracket 903, a return plate electric cylinder 904, a second ball-head push rod 905 and return plate flow guiding bars 906. One end of each of the return plate flow guiding bars 906 is connected to the return plate 8 by a hinge. The return plate electric cylinder 904 is connected to a lower side of the return plate 8 by the return plate electric cylinder fixing bracket 903 and pushes the second ball-head push rod 901 by the return plate electric cylinder 904 so as to drive the hinge to rotate so that an angle of the return plate flow guiding bars 906 on the return plate 8 can be adjusted. The angle can be adjusted within a range of 0°-180°. The other ends of the return plate flow guiding bars 906 are connected to each other by the return plate welding plate 902 and the second connecting rod 901 to achieve linkage of the return plate flow guiding bars. In practice, the number of return plate flow guiding bars 906 is 2-5, with a height of 30 mm-50 mm and a length of 100 mm-400 mm, which need to be determined through theoretical calculation and experimental verification according to the actual geometric dimensions of the machine.

Figure 7:
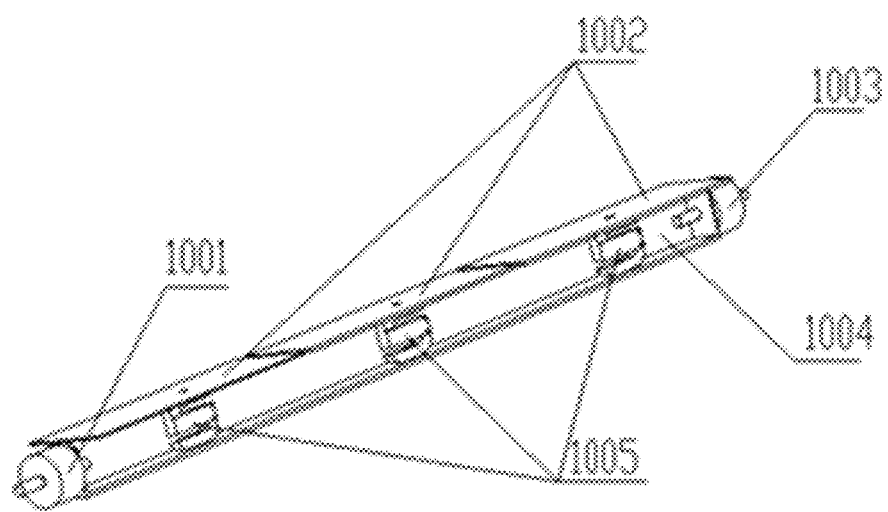
FIG. 7 is a schematic view of a return plate threshed material detecting device.

As shown in FIG. 7, the return plate threshed material detecting device 10 includes a first return plate vibration damper 1001, return plate threshed material detecting plates 1002, a second return plate vibration damper 1003, a return plate detecting device mounting bracket 1004 and return plate force sensors 1005. The return plate threshed material detecting plates 1002 and the return plate force sensors 1005 are perpendicularly connected to the return plate detecting device mounting bracket 1004, and then connected to the rack by the first return plate vibration damper 1001 and the second return plate vibration damper 1003, so that the return plate threshed material detecting plates 1002 face exactly toward the discharge port of the return plate 8 to monitor the real-time flow rates of threshed material in the regions corresponding to the return plate threshed material detecting plates. A suitable measurement range needs to be selected for the return plate force sensors 1005 according to the actual feeding amount of the machine and the installation position.

Figure 8:
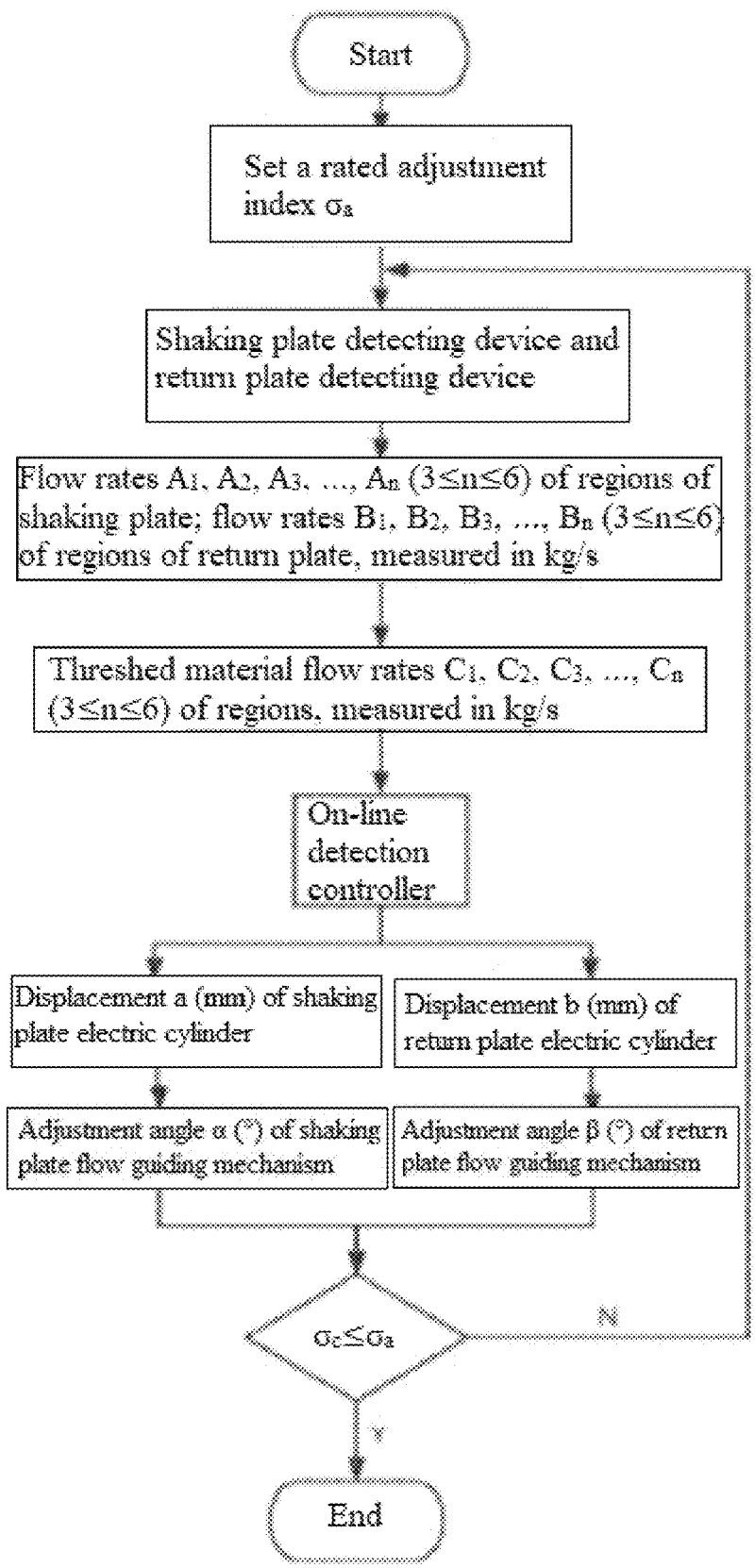
FIG. 8 is a flowchart of automatic detection and control of threshed material from a combine harvester.

As shown in FIG. 8, a combine harvester-mounted direct-current power supply supplies power to the on-line detection controller 12. The shaking plate force sensors 205 and the return plate force sensors 1005 are connected to the on-line detection controller 12, and transmit, in real time to the on-line detection controller 12, the threshed material flow rates at the discharge ports of the shaking plate 3 and the return plate 8 that are detected by the shaking plate threshed material detecting device 4 and the return plate threshed material detecting device 10. The on-line detection controller 12 then outputs control signals according to a built automatic adjustment model to control the shaking plate electric cylinder 403 and the return plate electric cylinder 904 to respectively drive the shaking plate flow guiding mechanism 405 and the return plate flow guiding mechanism 906 to automatically adjust the lateral uniformity of threshed material that is about to enter the cleaning chamber, so as to make the threshed material entering the cleaning chamber remain laterally uniformly distributed in real time, thereby improving the cleaning performance and efficiency.

This embodiment further provides an automatic adjusting method for a threshed material from a combine harvester, including the following steps. Step S1: Determining a rated threshed material adjustment index (σa) through theoretical calculation and bench testing according to throughput of a threshing and cleaning device of a combine harvester and with reference to crop characteristics and relevant national standards for harvesting machinery. Step S2: Measuring threshed material flow rates ($A_1, A_2, A_3, \ldots, A_n$)(measured in kg/s) corresponding to different lateral regions of a discharge port of a shaking plate 3 by using shaking plate force sensors 205, and measuring threshed material flow rates $B_1, B_2, B_3, \ldots, B_n$ (measured in kg/s) corresponding to different lateral regions of a discharge port of a return plate 8 by using return plate force sensors 1005. The lateral regions include $1^{st}$ to an $n^{th}$ regions, and n meets $3 \leq n \leq 6$. Step S3: Performing preprocessing including abnormal data replacement, missing data completion, and data de-noising on acquired signals of the threshed material flow rates ($A_1, A_2, A_3, \ldots, A_n$)(measured in kg/s) of the shaking plate 3 and the threshed material flow rates ($B_1, B_2, B_3, \ldots, B_n$) (measured in kg/s) of the return plate 8, correspondingly summing and amplifying the preprocessed signals to obtain total threshed material flow rates ($C_1, C_2, C_3, \ldots, C_n$) ($3 \leq n \leq 6$) of threshed material to be fed to a cleaning device, and transmitting the total threshed material flow rates ($C_1, C_2, C_3, \ldots, C_n$) ($3 \leq n \leq 6$) to an on-line detection controller 12. Step S4: Calculating an average $C_{avg}$ and a standard deviation (σa) of the total threshed material flow rates ($C_1, C_2, C_3, \ldots, C_n$) by the on-line detection controller based on an adaptive adjustment model by using detected values as input values, determining whether σc ≤ σa, and if yes, maintaining current positions of the flow guiding bars, and ending automatic adjustment of the threshed material; or if not, performing a clustering analysis of parametric time series of total threshed material flow rates $C_1, C_2, C_3, C_n$ ($3 \leq n \leq 6$) of the regions, an angle α of a shaking plate flow guiding mechanism and an angle θ of a return plate flow guiding mechanism which are acquired in real time, to find a rule $C_n = f(\alpha, \beta, t, C_n)$ ($3 \leq n \leq 6$) between the angle α of the shaking plate flow guiding mechanism, the angle β of the return plate flow guiding mechanism and the total threshed material flow rate ($C_n$) of each of the regions, studying an adjustment weight model of the shaking plate flow guiding mechanism and the return plate flow guiding mechanism, and building an adaptive adjustment model for a threshed material adjustment weight; outputting in real time corresponding control signals to control a shaking plate electric cylinder 403 and a return plate electric cylinder 903 to respectively drive a first ball-head push rod 401 to experience a displacement change and a second ball-head push rod 905 to experience a displacement change N, so that the angle of the shaking plate flow guiding mechanism and the angle of the return plate flow guiding mechanism are respectively adjusted by α=f(a, α) and β=f(b, β), wherein by comparing $C_1, C_2, C_3, C_n$ to obtain $C_{min}$ and setting $C_{adj} = C_{min} - C_{avg}$, the displacement change and the displacement change (b) are calculated according to $C_n = f(\alpha, \beta, t, C_n)$ ($3 \leq n \leq 6$) and the adaptive adjustment model for the threshed material adjustment weight, wherein $C_{min}$ is a minimum of threshed material amounts of the regions, $C_{adj}$ is a threshed material adjustment amount, and $C_{avg}$ is an average of the threshed material amounts of the regions; go back to the steep S2.

The embodiments are preferred embodiments of the present invention, but the present invention is not limited thereto. Any obvious improvements, replacements or variations made by those skilled in the art without departing from the essence of the present invention shall all fall within the scope of protection of the present invention.

What is claimed is:

1. An automatic uniform distribution apparatus for a threshed material from a combine harvester, the automatic uniform distribution apparatus comprising a tangential flow threshing and separating device, an axial flow threshing and separating device, a chaff screw conveyor and a vibrating sieve, wherein a shaking plate and a return plate are disposed above two ends of the vibrating sieve, the shaking plate is located below the tangential flow threshing and separating device, and the return plate is located below the axial flow threshing and separating device and the chaff screw conveyor, the shaking plate comprises a shaking plate flow guiding mechanism mounted on a side thereof onto which the threshed material from the tangential flow threshing and separating device falls, a shaking plate threshed material detecting device is mounted at a discharge port of the shaking plate, the return plate comprises a return plate flow guiding mechanism mounted on a side thereof onto which the threshed material from the axial flow threshing and separating device falls, a return plate threshed material detecting device is mounted at a discharge port of the return plate, the shaking plate threshed material detecting device and the return plate threshed material detecting device are both connected to an input terminal of an on-line detection controller, and the on-line detection controller is configured to control action processes of the shaking plate flow guiding mechanism and the return plate flow guiding mechanism.

2. The automatic uniform distribution apparatus for the threshed material from the combine harvester according to claim 1, wherein the shaking plate flow guiding mechanism comprises a first ball-head push rod, a shaking plate electric cylinder fixing bracket, a shaking plate electric cylinder, a shaking plate welding plate, shaking plate flow guiding bars and a first connecting rod; one end of each of the shaking plate flow guiding bars is connected to the shaking plate by a hinge, the shaking plate electric cylinder is connected to a lower side of the shaking plate by the shaking plate electric cylinder fixing bracket and pushes the first ball-head push rod by the shaking plate electric cylinder so as to drive the hinge to rotate, so that an angle of the shaking plate flow guiding bars on the shaking plate is adjustable, and other ends of the shaking plate flow guiding bars are connected to each other by the shaking plate welding plate and the first connecting rod to achieve linkage of the shaking plate flow guiding bars.

3. The automatic uniform distribution apparatus for the threshed material from the combine harvester according to claim 2, wherein the shaking plate threshed material detecting device comprises a shaking plate detecting device mounting bracket, shaking plate threshed material detecting plates are mounted above the shaking plate detecting device mounting bracket, shaking plate force sensors are mounted below the shaking plate threshed material detecting plates, and two ends of the shaking plate detecting device mounting bracket are connected to a rack by a first shaking plate vibration damper and a second shaking plate vibration damper.

4. The automatic uniform distribution apparatus for the threshed material from the combine harvester according to claim 3, wherein the shaking plate electric cylinder is connected to an output terminal of the on-line detection controller, and the shaking plate force sensors are connected to the input terminal of the on-line detection controller.

5. The automatic uniform distribution apparatus for the threshed material from the combine harvester according to claim 1, wherein the return plate flow guiding mechanism comprises a second connecting rod, a return plate welding plate, a return plate electric cylinder fixing bracket, a return plate electric cylinder, a second ball-head push rod and return plate flow guiding bars; one end of each of the return plate flow guiding bars is connected to the return plate by a hinge, the return plate electric cylinder is connected to a lower side of the return plate by the return plate electric cylinder fixing bracket and pushes the second ball-head push rod by the return plate electric cylinder so as to drive the hinge to rotate, so that an angle of the return plate flow guiding bars on the return plate is adjustable, and other ends of the return plate flow guiding bars are connected to each other by the return plate welding plate and the second connecting rod to achieve linkage of the return plate flow guiding bars.

6. The automatic uniform distribution apparatus for the threshed material from the combine harvester according to claim 5, wherein the return plate threshed material detecting device comprises a return plate detecting device mounting bracket, return plate threshed material detecting plates are mounted above the return plate detecting device mounting bracket, return plate force sensors arc mounted below the return plate threshed material detecting plates, and two ends of the return plate threshed material detecting device are connected to a rack by a first return plate vibration damper and a second return plate vibration damper.

7. The automatic uniform distribution apparatus for the threshed material from the combine harvester according to claim 6, wherein the return plate electric cylinder is connected to an output terminal of the on-line detection controller, and the return plate force sensors are connected to the input terminal of the on-line detection controller.

* * * * *